(12) United States Patent
Pursifull (10) Patent No.: US 9,004,050 B2
(45) Date of Patent: Apr. 14, 2015

(54) GASEOUS FUEL RAIL SENSOR DIAGNOSTICS

(75) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 448 days.

(21) Appl. No.: 13/451,343

(22) Filed: Apr. 19, 2012

(65) Prior Publication Data

US 2013/0276758 A1 Oct. 24, 2013

(51) Int. Cl.
  F02D 41/22 (2006.01)
  F02D 19/02 (2006.01)
  F02D 41/00 (2006.01)
  F02M 21/02 (2006.01)

(52) U.S. Cl.
  CPC .............. F02D 41/22 (2013.01); F02D 19/021 (2013.01); F02D 41/0027 (2013.01); F02D 2041/224 (2013.01); F02D 2200/0606 (2013.01); F02M 21/0245 (2013.01); Y02T 10/32 (2013.01); Y02T 10/40 (2013.01)

(58) Field of Classification Search
  USPC ............. 123/27 GE, 525–527, 529, 456, 458, 123/464, 479, 686, 688, 689, 690; 73/114.38, 114.77
  See application file for complete search history.

(56) References Cited

U.S. PATENT DOCUMENTS

| | | | |
|---|---|---|---|
| 5,474,054 A * | 12/1995 | Povinger et al. ............... | 123/689 |
| 5,614,664 A * | 3/1997 | Yamagishi ................. | 73/114.38 |
| 5,661,316 A | 8/1997 | Kish, Jr. et al. | |
| 5,671,711 A * | 9/1997 | Collie ........................... | 123/299 |
| 5,983,714 A | 11/1999 | Izumiura et al. | |
| 6,145,494 A | 11/2000 | Klopp | |
| 6,240,910 B1 | 6/2001 | Maekawa et al. | |
| 6,401,698 B1 | 6/2002 | Yamazaki et al. | |
| 6,807,851 B2 * | 10/2004 | Wakahara et al. ......... | 73/114.39 |
| 6,990,968 B2 | 1/2006 | Nagaishi et al. | |
| 7,383,804 B2 * | 6/2008 | Wolber et al. ............ | 123/179.16 |
| 7,463,967 B2 * | 12/2008 | Ancimer et al. .............. | 701/104 |
| 7,467,622 B2 | 12/2008 | Tokunaga | |
| 8,240,192 B2 * | 8/2012 | Nakata et al. .............. | 73/114.38 |
| 2009/0178474 A1 * | 7/2009 | Bailey ........................ | 73/114.38 |

(Continued)

FOREIGN PATENT DOCUMENTS

| | | |
|---|---|---|
| WO | 2006018154 A1 | 2/2006 |
| WO | 2007042388 A1 | 4/2007 |
| WO | 2011114754 A1 | 9/2011 |

OTHER PUBLICATIONS

Pursifull, Ross Dykstra, "Method and System for Engine Control," U.S. Appl. No. 13/369,052, filed Feb. 8, 2012, 31 pages.
Ulrey, Joseph Norman et al., "System and Method for Emptying a Tank," U.S. Appl. No. 13/431,295, filed Mar. 27, 2012, 33 pages.

(Continued)

Primary Examiner — Erick Solis
(74) Attorney, Agent, or Firm — Julia Voutyras; Alleman Hall McCoy Russell & Tuttle LLP (57) ABSTRACT

Embodiments for indicating fuel rail temperature sensor degradation are provided. In one embodiment, an engine method comprises delivering gaseous fuel to a cylinder based on feedback from a fuel rail temperature sensor, and during select conditions, indicating fuel rail temperature sensor degradation based on a difference between measured fuel rail temperature and an expected temperature. In this way, measured fuel rail temperature may be correlated with other engine temperatures to detect sensor degradation.

19 Claims, 4 Drawing Sheets

(56) References Cited

U.S. PATENT DOCUMENTS

2012/0143480 A1  6/2012  Pursifull
2013/0019669 A1* 1/2013  Wakao et al. .............. 73/114.42

OTHER PUBLICATIONS

Pursifull, Ross Dykstra, "System and Method for Compensating Gaseous Fuel Injection," U.S. Appl. No. 13/495,928, filed Jun. 13, 2012, 22 pages.

* cited by examiner

GASEOUS FUEL RAIL SENSOR DIAGNOSTICS

FIELD

The present application relates to engine operation in a mono-fuel or bi-fuel vehicle using compressed natural gas.

BACKGROUND AND SUMMARY

Alternate fuels have been developed to mitigate the rising prices of conventional fuels and for reducing exhaust emissions. For example, natural gas has been recognized as an attractive alternative fuel. For automotive applications, natural gas may be compressed and stored as a gas in cylinders at high pressure. A pressure regulating valve may then be used to supply the compressed natural gas (CNG) at lower pressures to an engine combustion chamber.

Various fuel sensors may be included in both conventional and alternate fuel engine systems, in order to monitor fuel storage amounts and regulate the metering of the fuel to the engine. To ensure each fuel sensor is functioning properly, rationality checks may be carried out under certain conditions, where the output of each fuel sensor is compared to the output of certain other engine sensors. If the fuel sensor output does not match the output of the other engine sensors, degradation of the fuel sensor may be indicated.

However, the inventors herein have recognized a potential issue with such an approach. Due to the expansion of CNG fuel through a regulator before reaching a fuel rail, cooling of the CNG fuel may occur. This cooling may hinder correlation between the temperature measured by a fuel rail temperature sensor and temperature measured by other engine sensors, such as engine coolant temperature. Thus, degradation of the fuel rail temperature sensor may be difficult to detect.

In one example, some of the above issues may be at least partly addressed by an engine method. In one embodiment, the method includes delivering gaseous fuel to a cylinder based on feedback from a fuel rail temperature sensor, and during select conditions, indicating fuel rail temperature sensor degradation based on a difference between measured fuel rail temperature and an expected temperature.

In this way, a rationality check may be performed on the fuel rail temperature sensor, configured to measure the temperature of a gaseous fuel such as compressed natural gas, while the engine is operating. In one example, the temperature measured by the fuel rail temperature sensor may be compared to the measured underhood temperature during idle engine operation. If the two temperature measurements differ by more than a threshold amount, fuel rail temperature sensor degradation may be indicated, and various mitigating actions taken in response the indicated degradation.

Furthermore, in a bi-fuel vehicle, a similar approach may be taken when the gaseous fuel system is not in use (but the other fuel system, e.g., gasoline system, is in use). When not in use, the gaseous fuel componentry tends to be equal to the underhood temperature, and thus the gaseous fuel rail temperature may be compared to the underhood temperature in order to determine if the rail temperature sensor is degraded. This temperature rationality action may supplement the inter-temperature sensor correlation checks that occur at the "key-on after a long temperature soak" condition, e.g., during idle operation. Another condition that can be used for fuel rail temperature rationality check is whether the fuel rail temperature is below underhood temperature at a condition of an extended medium to high fuel rate, where the cold fuel has a chance to cool the conduits in which it is conducted.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
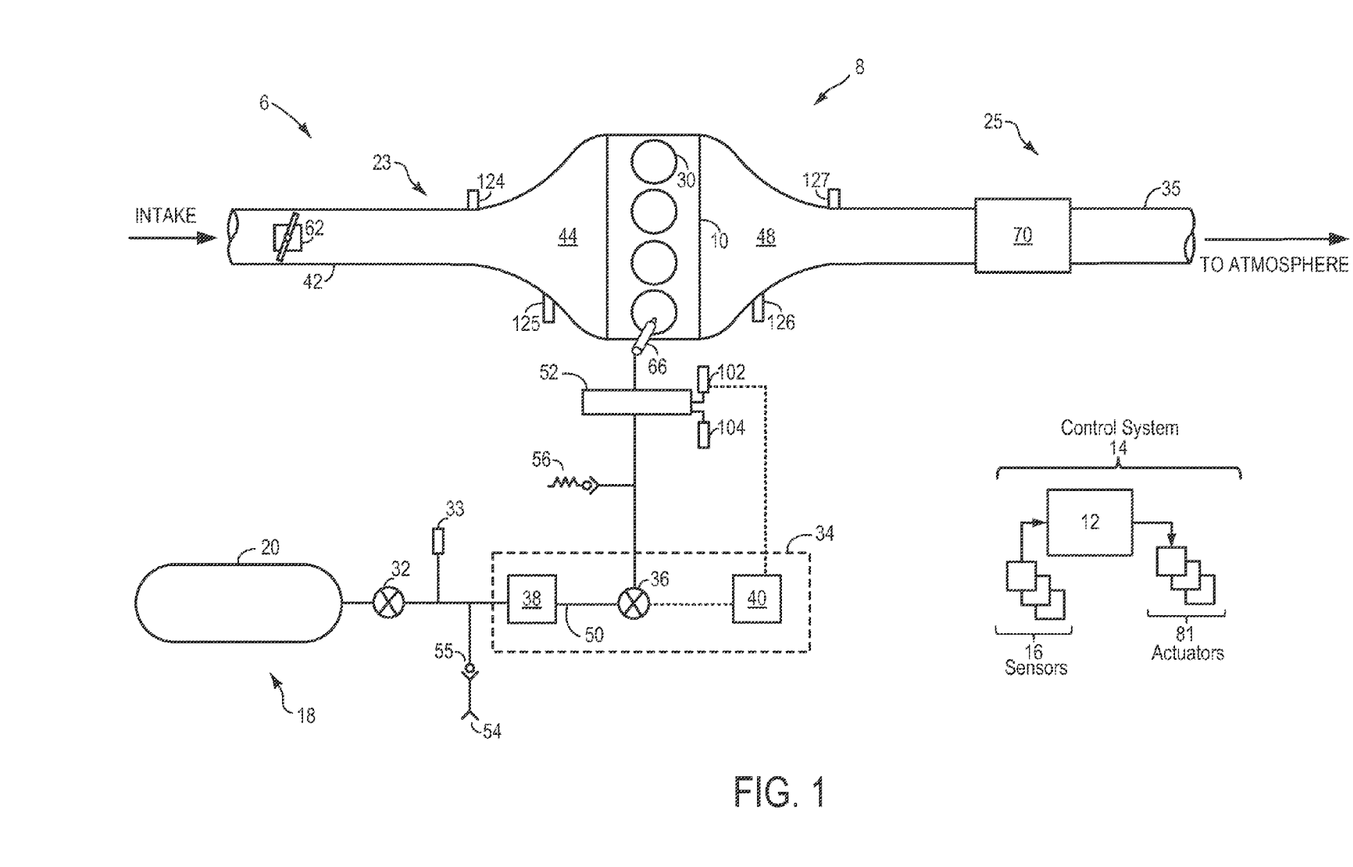
FIG. 1 shows a schematic depiction of an engine system configured to operate on one or more fuels of differing chemical and/or physical properties.

Detection of fuel rail temperature sensor degradation is particularly difficult in compressed natural gas engines. Because the gas is stored in the fuel tank as a compressed gas and expanded via a regulator before reaching the rail, the temperature of the fuel drops after entering the regulator. Thus correlating the temperature of the fuel rail to other measureable engine temperatures, such as engine coolant temperature, may be difficult, especially while the engine is operating. During conditions of high fuelling rates, an isentropic expansion model, adapted to account for cooling of the regulator and heating of the fuel rail, may be used to estimate fuel rail temperature and determine accuracy of the fuel rail temperature sensor. However, calibrating the model may be resource-intensive and as such a simpler rationality check may be utilized in low fuelling conditions, where the temperature of the fuel rail is approximately equal the vehicle under hood temperature. FIG. 1 is a diagram of a vehicle system including a fuel system configured to deliver gaseous fuel to an engine, and includes a controller configured to carry out the control routines of FIGS. 2-4.

FIG. 1 shows a schematic depiction of a vehicle system 6. The vehicle system 6 includes an engine system 8, a control system 14, and a fuel system 18. The engine system 8 may include an engine 10 having a plurality of cylinders 30. The engine 10 includes an engine intake 23 and an engine exhaust 25. The engine intake 23 includes a throttle 62 fluidly coupled to the engine intake manifold 44 via an intake passage 42. The engine exhaust 25 includes an exhaust manifold 48 leading to an exhaust passage 35 that routes exhaust gas to the atmosphere upon passage through an emission control device 70. It will be appreciated that other components may be included in the engine such as a variety of valves and sensors.

Fuel system 18 may include one or more fuel tanks. In the depicted example, the fuel system is a mono-fuel system including fuel tank 20 configured to store a gaseous fuel at high pressure and deliver the fuel to the engine 10 along fuel line 50. In one example, the gaseous fuel may be compressed natural gas (CNG) or liquefied petroleum gas (LPG). Various fuel system components, such as various valves, pressure regulators, filters, and sensors, may be coupled along fuel line 50, as described below.

In alternate embodiments, fuel system 18 may include one or more additional fuel tanks for delivering other fuels having different chemical and physical properties to the engine along dedicated fuel lines (not shown). For example, the gaseous fuel in fuel tank 20 may be a first fuel and the fuel system may include a second liquid fuel, such as gasoline, fuel with a range of alcohol concentrations, various gasoline-ethanol fuel blends (e.g., E10, E85), and combinations thereof.

Fuel tank 20 may be refilled with gaseous fuel via fueling port 54. A check valve 55 may be coupled between the fuel tank and the fuel port to ensure correct flow of fuel. Fuel may be delivered from fuel tank 20 to the injectors of engine 10, such as example injector 66, via fuel rail 52. While only a single injector 66 is depicted, additional injectors are provided for each cylinder 30. In one example, where fuel system 18 includes a direct injection system, injector 66 may be configured as a direct fuel injector. In an alternate embodiment, fuel system 18 may include a port injection system wherein injector 66 may be configured as a port fuel injector. In still other embodiments, each cylinder may include one or more injectors including a direct injector and a port injector.

For example, fuel tank 20 may be coupled to a fuel tank valve 32 for regulating a pressure of the gaseous fuel delivered into fuel line 50. As such, fuel tank valve 32 may be configured to deliver the gaseous fuel into fuel line 50 at a pressure that is lower than the pressure of the fuel in the fuel tank, but higher than the pressure of the gaseous fuel in fuel rail 52. In one example, tank valve 32 is a solenoid valve (herein also referred to as a low pressure solenoid valve). A fuel rail pressure sensor 102 may be configured to provide an estimate of the actual fuel rail pressure. A fuel rail temperature sensor 104 may be coupled to fuel rail 52 to detect fuel rail temperature.

Fuel tank 20 may be further coupled to a pressure regulator 34 to enable a fixed lower pressure supply of the gaseous fuel to be provided to fuel rail 52 and from there to injector 66. In one example, fuel tank 20 may store the gaseous fuel in a pressure range of 10-700 bar (e.g., 0-100+ psi for LNG fuel, 500 psi for ANG fuel, 3000-6000 psi, or 250 bar, for CNG fuel, and 5000-10,000 psi for hydrogen fuel) while pressure regulator 34 may regulate the fuel rail pressure to a fixed range of 2 to 40 bar (e.g., 2 to 10 bar for CNG fuel). In the depicted example, pressure regulator 34 is an electronic pressure regulator including a mechanical pressure regulator 38, a fuel rail valve 36, and an electronic feedback component 40. Fuel rail valve 36 may be a duty cycle controlled solenoid valve (herein also referred to as a high pressure solenoid valve). Electronic feedback component may receive input regarding the current fuel rail pressure from fuel rail pressure sensor 102, and accordingly adjust the duty cycle of fuel rail valve 36 to thereby adjust the valve's opening. For example, the mechanical regulator may regulate the pressure to 15 bar while the duty controlled solenoid valve may further regulate the pressure to between 5 and 10 bar.

It will be appreciated that while the depicted embodiment shows pressure regulator 34 as an electronic regulator, in alternate embodiments, pressure regulation may be via only mechanical pressure regulator 38 wherein fuel rail valve 36 may be configured as a simpler on/off valve with no electronic feedback. However, by including electronic feedback input, pressure regulation may be achieved in the electronic regulator embodiment via the use of a smaller, relatively less accurate mechanical regulator.

In some embodiments, a check valve (not shown) may be positioned between fuel tank 20 and pressure regulator 34 to ensure correct flow of fuel from the fuel tank. A tank output line pressure sensor (or pressure transducer) 33 may be positioned upstream of pressure regulator 34 and downstream of fuel tank 20 to provide an estimate of fuel line pressure before pressure regulation by the pressure regulator 34. That is, pressure sensor 33 may provide an estimate of fuel pressure input on the higher pressure side of pressure regulator 34. A coalescing filter (not shown) may be positioned on the lower pressure side of pressure regulator 34 such that fuel rail valve 36 is coupled between mechanical pressure regulator 38 and the coalescing filter.

Fuel system 18 may further include a vent 56 for enabling pressure relief. Specifically, closed vent 56 may be selectively opened in response to elevated fuel rail pressures to vent some of the fuel in fuel line 50, thereby reducing the fuel rail pressure to a targeted value. As one example, where pressure regulator 34 is configured to regulate the pressure of the gaseous fuel to 15 bar, vent 56 may be opened in response to a fuel rail pressure of 20 bar. By venting fuel during elevated fuel rail pressures, component damage from prolonged exposure to elevated fuel rail pressures can be reduced. While vent 56 may provide at least some pressure relief, the stream of vented fuel may lead to other issues. Thus, during some conditions, in response to elevated fuel rail pressures, tank valve 32 may be shut off to reduce usage of the gaseous fuel, at least temporarily.

Figure 2:
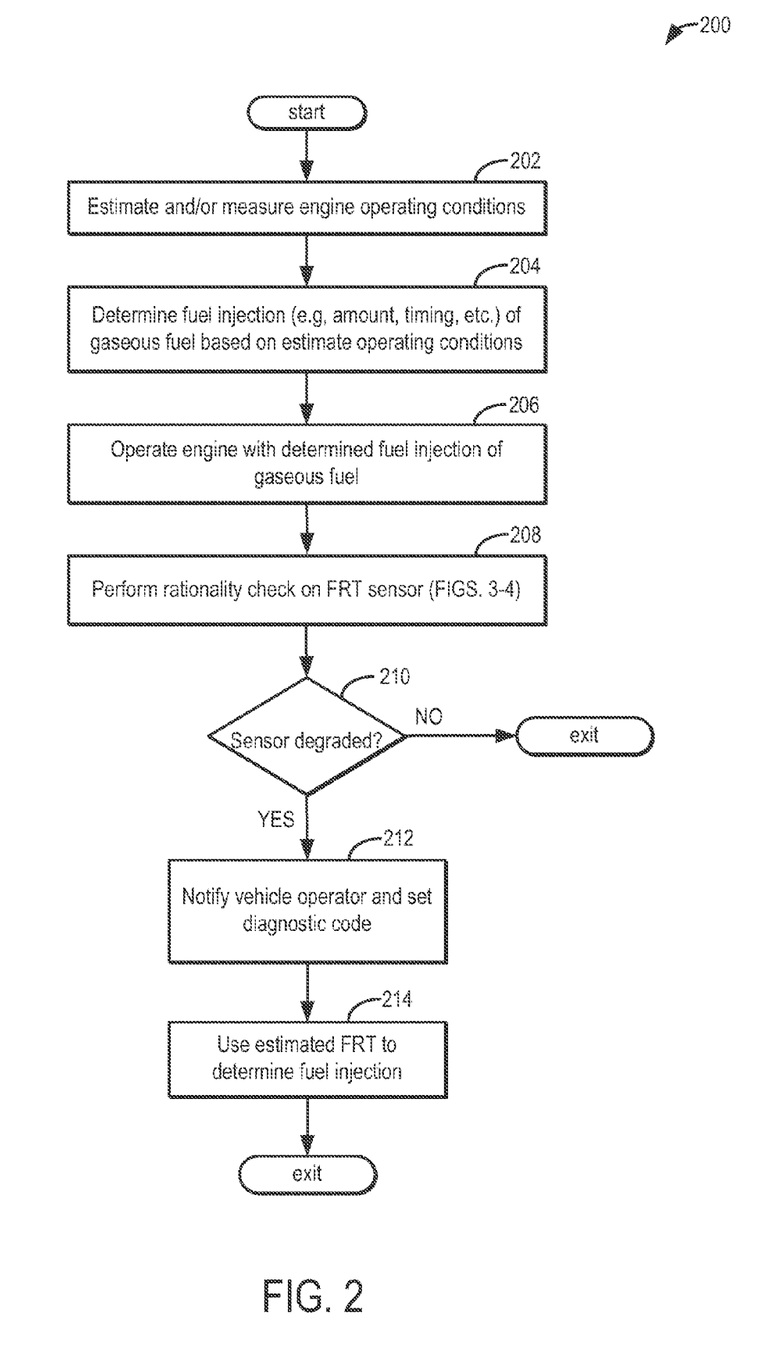
FIG. 2 shows a flow chart illustrating a method for operating an engine configured to combust gaseous fuel.
Figure 3:
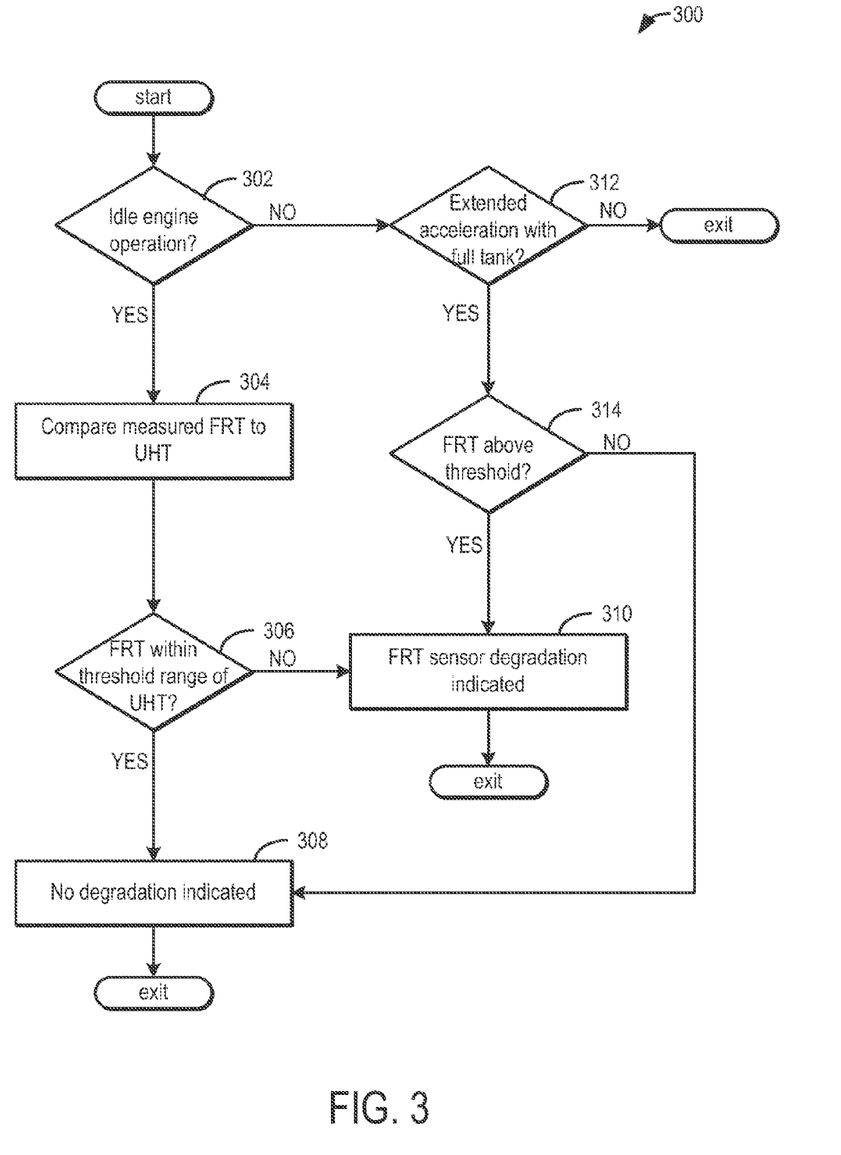
FIGS. 3-4 show flow charts illustrating methods for indicating fuel rail temperature sensor degradation according to embodiments of the present disclosure.
Figure 4:
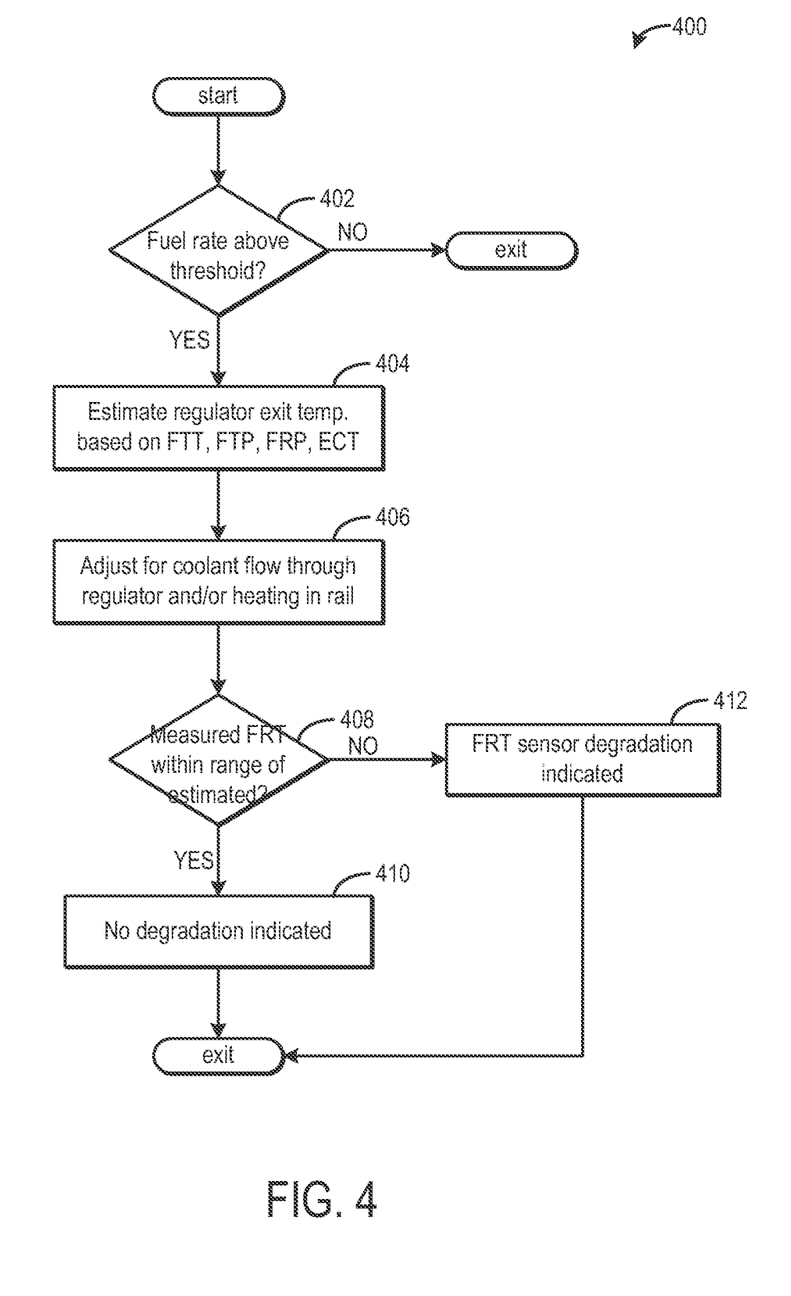

As elaborated herein with reference to FIGS. 2-4, during selected conditions, diagnostic routines may be performed to determine if the fuel rail temperature sensor 104 is degraded. For example, it may be determined if output from the fuel rail temperature sensor correlates with other engine temperature measurements, and if not, degradation may be indicated and accordingly appropriate mitigating actions may be taken, such as notifying an operator of the vehicle. Another sensible fault value substitution action is to set the fuel rail temperature equal to the underhood temperature for use during engine control routines that rely on the fuel rail temperature, such as determining how much fuel to deliver to the cylinders. Alternately, the fuel rail temperature can be set to a temperature lower than underhood temperature if the fuel flow rate is high. If component degradation is not accurately determined and timely addressed, inaccurate determination of fuel amount in the fuel rail may arise that can lead to incorrect fuel metering and engine performance degradation.

Returning to FIG. 1, vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include MAP and MAF sensors 124 and 125 in the intake, exhaust gas sensor 126 and temperature sensor 127 located in the exhaust, pressure sensors 102, 32 coupled to the fuel line and fuel rail respectively, fuel rail temperature sensor 104, etc. Other sensors such as pressure, temperature, fuel level, air/fuel ratio, and composition sensors may be coupled to various locations in the vehicle system 6. For example, a temperature sensor may be coupled to a battery (not shown) of the vehicle system 6 or another component outside engine 10 to give a measurement of (or inference of) vehicle underhood temperature. As another example, the actuators may include fuel pumps, fuel injector 66, solenoid valves 32 and 36, pressure regulator 34, and throttle 62. The control system 14 may include a controller 12. The controller may receive input data from the various sensors, process the input data, and trigger the actuators in response to the processed input data based on instruction or code programmed therein corresponding to one or more routines. Example control routines are described herein with regard to FIGS. 2-4.

The various components of the system of FIG. 1 enable a method for a fuel system configured to deliver a gaseous fuel to an engine, comprising during a first condition, indicating fuel rail temperature sensor degradation if measured fuel rail temperature is outside a threshold range from measured underhood temperature, and during a second condition, indicating fuel rail temperature sensor degradation if measured fuel rail temperature is above a threshold. The first condition may comprise idle engine operation, and the second condition may comprise an extended acceleration event with fuel storage level above a storage threshold. Further, in some embodiments, the first and second conditions may be mutually exclusive.

Further, the system of FIG. 1 enables a vehicle system comprising a fuel tank configured to store a gaseous fuel, a fuel rail for delivering the gaseous fuel to an engine, and a controller including instructions to deliver a desired amount of gaseous fuel to the engine based on feedback from a fuel rail temperature sensor, and, during idle engine operation, indicate fuel rail temperature sensor degradation if a measured fuel rail temperature differs from a measured under hood temperature.

Now turning to FIG. 2, an example method 200 of operating the engine system of FIG. 1 with a gaseous fuel is described.

At 202, the method includes estimating and/or measuring engine operating conditions. These may include, for example, engine speed, torque demand, ambient conditions (e.g., temperature, pressure, humidity, etc.), engine temperature, fuel level in the fuel tank, fuel rail pressure (FRP), fuel rail temperature (FRT), etc. At 204, fuel injection details (e.g., amount, timing, etc.) for the gaseous fuel may be determined based on the estimated operating conditions. For example, the amount of fuel stored in the fuel rail may be determined based on measured FRP and FRT, and the duration of the fuel injection may be set based on the amount of fuel in the fuel rail. Accordingly, at 206, the engine may be operated with injection of the gaseous fuel.

It will be appreciated that the above steps are applicable in a mono-fuel system. If the fuel system is a multi-fuel system (e.g., a bi-fuel system having a primary gaseous fuel and a second liquid fuel), additional steps may be includes to confirm the driver's fuel selection and whether sufficient amount of the selected fuel is available to provide the desired fuel injection.

At 208, a rationality check may be performed on the FRT sensor. During selected conditions during engine operation, the output of the FRT sensor may be correlated with other engine temperature measurements, such as under hood temperature, in order to check the functionality of the FRT sensor. Further, in some embodiments, an estimated FRT may be calculated based on fuel system conditions, such as fuel tank pressure, fuel rail pressure, etc., and the measured FRT may be compared to the estimated FRT. Example methods for performing the rationality check on the FRT will be described below with respect to FIGS. 3 and 4.

At 210, it is determined if the FRT sensor is degraded. If not, method 200 exits. If FRT sensor degradation is indicated by one or more rationality checks, method 200 proceeds to 212 to notify a vehicle operator of the degraded sensor, for example by illuminating a malfunction indicator light, and/or set a diagnostic code. At 214, the estimated FRT, determined based on method 400 described with respect to FIG. 4, may be used to determined fuel injection details. Alternatively or additionally, the underhood temperature may be used as a substitute for the fuel rail temperature, if the fuel rail temperature sensor is degraded, to determine the fuel injection details. Method 200 then exits.

Now turning to FIG. 3, an example method 300 is shown for a first rationality check routine that may be performed to determine if degradation of a FRT sensor has occurred. A second example rationality check routine is shown at method 400 of FIG. 4. In one embodiment, the routines may be performed in a predefined order with the first routine performed before the second routine, or they may be performed simultaneously. However, in alternate embodiments, the order may be different, or a diagnostics routine may be selected based on the prevalent vehicle conditions.

At 302, method 300 includes determining if the engine is operating at idle. Idle conditions may be detected based on engine speed and load, operation of an idle throttle, etc. Further, in some embodiments, idle conditions may include a low fuel rate to the engine. If idle conditions are detected, method 300 proceeds to 304 to compare measured FRT from the FRT sensor to underhood temperature. The underhood temperature (UHT) may be determined from a sensor in the vehicle, such as a sensor coupled to the battery or other component external of the engine. During idle conditions, the fuel system delivers a relatively low amount of fuel to the engine. Due to the low fuelling rate, a relatively small amount of fuel may pass through the regulator to the fuel rail and/or the fuel in the rail may accumulate for a long enough period of time to equalize with vehicle temperature. As such, the FRT may be approximately equal to the UHT during idle conditions.

At 306, it is determined if the FRT is within a threshold range of the UHT. The threshold range may be within 5% of the UHT, 10% of the UHT, or another suitable range. If the FRT is within the threshold range of the UHT, method 300 proceeds to 308 to indicate no degradation of the FRT sensor. Method 300 then exits. However, if at 306 it is determined that the FRT is not within threshold range of the UHT, method 300 proceeds to 310 to indicate FRT sensor degradation, and then method 300 exits.

Returning to 302, if it was determined that the engine is not in idle operation, method 300 proceeds to 312 to determine if the engine is in an extended acceleration event with a full fuel tank. When the fuel tank is at maximum or nearly maximum storage capacity, such as following a tank refill event, the gaseous fuel stored in the tank may be at maximum pressure. During an extended acceleration event, when fuelling rate is at maximum, the pressure drop across the regulator due to the high tank pressure is high, causing a drop in gas temperature before entering the fuel rail. Thus, cold fuel is present at the fuel rail during an extended acceleration event with a substantially full fuel tank. As extended acceleration event may comprise an increase in engine speed that is sustained for a duration greater than a threshold amount, such as one second, five seconds, etc. In other embodiments, the extended acceleration event may comprise another suitable event that results in maximum or near-maximum fuelling rates.

If it is determined at 312 that the engine is not in an extended acceleration event with a full tank, method 300 exits. If the engine is in an extended acceleration with a full tank, method 300 proceeds to 314 to determine if the FRT as sensed by the FRT sensor is above a threshold. The temperature threshold may be a suitable temperature below which indicates a maximum pressure drop across the regulator, and may depend on type of gaseous fuel, maximum pressure of the fuel tank, length of the acceleration event, fuelling rate, etc., or may be a fixed threshold, such as 0° C. in one embodiment, or −100° C. in another embodiment. Other threshold temperatures are possible.

If the FRT is above the threshold, method 300 proceeds to 310 to indicated FRT sensor degradation, and then method 300 exits. If the FRT is not above the threshold, the FRT sensor detected the cold gas entering the rail as a result of the pressure drop at the regulator, and as such no sensor degradation is indicated at 308. Method 300 then exits.

Referring now to FIG. 4, method 400 includes determining, at 402, if the fuel rate is above a threshold. Fuel rate may be inferred based on engine speed and load, or may be determined based on the fuelling signal sent from the controller to the fuel injectors. The fuel rate threshold may be a threshold that indicates a relatively high fuel rate, for example a rate of 80% of maximum. If the fuel rate is below the threshold, method 400 exits. If the fuel rate is above the threshold, method 400 proceeds to 404 to estimate a regulator exit temperature. During operation with high fueling rates, the FRT may be estimated based on certain parameters of the fuel system, following the laws of isentropic expansion across the regulator. The regulator exit temperature may be equal to the fuel rail temperature under some conditions, such as when the regulator is a coolant-less regulator, or when the fuel in the fuel rail is not heated by the surrounding air/coolant temperature. The regulator exit temperature (and hence FRT) may be estimated based on fuel tank pressure (FRP), fuel tank temperature (FTT), fuel rail pressure (FRP), and engine temperature (ECT), using the following equation:

$$FRT=FTT*(FRP/FTP)\char`\^((k-1)/k),$$

where k is the specific heat ratio of the gaseous fuel.

In one example, if the gaseous fuel is CNG, comprised of methane, the specific heat ratio is 1.299, and, given a typical FRP of 9 bar and FTT of 27° C., the estimated FRT is a function of the FTP, which may fluctuate as fuel storage levels decrease. For a FTP of 9 bar, because there is no expansion across the regulator (fuel rail pressure and fuel tank pressure are equal), the FRT is equal to the FTT:

$$FRT=27*(9/9)\char`\^0.2307=27°\ C.$$

If the FTP increases, following a tank refill, for example, the FRT decreases as the pressure is decreased at the regulator:

$$FRT=27*(9/250)\char`\^0.2307=-134°\ C.$$

Under other conditions, the regulator exit temperature may be adjusted to account for cooling at the regulator by coolant, and/or to account for heating of the fuel while the in the fuel rail, in order to estimate the FRT, at 406. In one example, the coolant flow into the regulator may be a constant flow of coolant at approximately ECT. The heating of the fuel while in the rail may be a function of ECT, cylinder head temperature, or underhood temperature.

At 408, the FRT measured by the sensor is compared to the estimated FRT, determined at 404 and 406, above, and it is determined if the measured FRT is within a threshold range of the estimated FRT. The threshold range may be within 5% of the estimated FRT, within 10%, or another suitable range. If the measured FRT is within the threshold range, method 400 proceeds to 410 to indicate no degradation, and then method 400 exits. If the measured FRT is not within the threshold range of the estimated FRT, method 400 proceeds to 412 to indicated FRT sensor degradation, and method 400 exits.

Thus, the methods presented above with respect to FIGS. 2-4 provide for delivering a gaseous fuel to an engine via a fuel rail. The FRT sensor may be monitored to ensure the output of the FRT sensor is rational, and if not, degradation may be indicated. In one embodiment, if degradation is indicated via one of correlation to UHT, detection of cold fuel during a long acceleration with a fuel tank, or comparison to estimated FRT, degradation may be indicated in method 200, and the mitigating action taken. However, in other embodiments, more than one of the rationality check mechanisms may be performed, and if each mechanism indicates degradation, then the mitigating action taken. As explained above with reference to FIG. 2, the mitigating action may include notifying an operator of the vehicle and setting a diagnostic code. If the routine to estimate the FRT has been carried out (e.g., the routine of FIG. 4), the estimated FRT may be used to calculate the amount of fuel in the rail, when determining fuel injection amounts, for example. Further, in some embodiments, if the FRT sensor is degraded, additional engine parameters may be adjusted. For example, in order to avoid low fuel rail temperatures that may result in condensation of the gaseous fuel or other engine degradation, engine torque may be limited to reduce fuelling rates, thus bringing the fuel rail temperature closer to underhood temperature.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
delivering gaseous fuel to a cylinder based on feedback from a fuel rail temperature sensor; and
during a first condition that includes an extended acceleration event with a fuel storage level above a storage threshold, indicating fuel rail temperature sensor degradation based on measured fuel rail temperature being above a threshold temperature.

2. The engine method of claim 1, wherein the gaseous fuel is compressed natural gas.

3. The engine method of claim 1, further comprising during a second condition, indicating fuel rail temperature sensor degradation if the measured fuel rail temperature differs from an expected temperature by greater than a threshold amount.

4. The engine method of claim 3, wherein the second condition comprises idle engine operation, and wherein the expected temperature is based on a measured under hood temperature.

5. The engine method of claim 3, wherein the second condition comprises a fuel rate above a threshold, and wherein the expected temperature is estimated based on fuel tank temperature, fuel tank pressure, fuel rail pressure, and engine temperature.

6. The engine method of claim 1, further comprising, if fuel rail temperature sensor degradation is indicated, notifying a vehicle operator and setting a diagnostic code.

7. A method for a fuel system configured to deliver a gaseous fuel to an engine, comprising:
during a first condition, indicating fuel rail temperature sensor degradation if measured fuel rail temperature is outside a threshold range from measured under hood temperature; and
during a second condition, indicating fuel rail temperature sensor degradation if measured fuel rail temperature is above a threshold.

8. The method of claim 7, further comprising delivering a desired amount of the gaseous fuel to a cylinder of the engine based on feedback from the fuel rail temperature sensor, and wherein the first and second conditions are mutually exclusive.

9. The method of claim 7, wherein the first condition comprises idle engine operation.

10. The method of claim 7, wherein the second condition comprises an extended acceleration event with a fuel storage level above a storage threshold.

11. The method of claim 7, further comprising, if fuel rail temperature sensor degradation is indicated, taking default action including setting a diagnostic code.

12. The method of claim 7, further comprising indicating fuel rail temperature sensor degradation if measured fuel rail temperature differs from an estimated fuel rail temperature.

13. The method of claim 12, wherein the estimated fuel rail temperature is based on fuel tank temperature, fuel tank pressure, fuel rail pressure, and engine temperature.

14. The method of claim 12, further comprising, if fuel rail temperature sensor degradation is indicated, delivering a desired amount of the gaseous fuel to a cylinder of the engine based on the estimated fuel rail temperature.

15. A vehicle system comprising:
a fuel tank configured to store a gaseous fuel;
a fuel rail for delivering the gaseous fuel to an engine; and
a controller including instructions to:
deliver a desired amount of gaseous fuel to the engine based on feedback from a fuel rail temperature sensor; and
during idle engine operation, indicate fuel rail temperature sensor degradation if a measured fuel rail temperature differs from a measured under hood temperature.

16. The vehicle system of claim 15, wherein the gaseous fuel is compressed natural gas.

17. The vehicle system of claim 15, wherein the controller includes further instructions to, if fuel rail temperature sensor degradation is indicated, notify an operator of the vehicle and set a diagnostic code.

18. The vehicle system of claim 15, wherein the controller includes further instructions to indicate fuel rail temperature sensor degradation if measured fuel rail temperature differs from an estimated fuel rail temperature, the estimated fuel rail temperature based on fuel tank temperature, fuel tank pressure, fuel rail pressure, and engine temperature.

19. The vehicle system of claim 18, wherein the controller includes further instructions to, if fuel rail temperature sensor degradation is indicated, deliver a desired amount of gaseous fuel to the engine based on the estimated fuel rail temperature.

* * * * *